United States Patent
Wei

(10) Patent No.: US 6,594,900 B1
(45) Date of Patent: Jul. 22, 2003

(54) METHOD FOR MANUFACTURING A PIPE CONNECTOR OF A GAS ISOLATED SWITCHGEAR

(76) Inventor: Long-Yi Wei, No. 80, Sec. 3, Yunko Rd., Touliu,Yunlin Hsien (TW)

( * ) Notice: Subject to any disclaimer, the term of this patent is extended or adjusted under 35 U.S.C. 154(b) by 16 days.

(21) Appl. No.: 10/061,922

(22) Filed: Feb. 1, 2002

(51) Int. Cl.⁷ ................................................. B23P 17/00
(52) U.S. Cl. ............................. 29/890.14; 29/890.145; 29/890.147; 29/558
(58) Field of Search ...................... 29/890.14, 890.141, 29/890.144, 890.145, 890.147, 897, 557, 558, DIG. 18, DIG. 47; 72/368, 370.04, 377; 148/688, 689, 519; 138/177

(56) References Cited

U.S. PATENT DOCUMENTS

| | | | | | |
|---|---|---|---|---|---|
| 1,872,357 A | * | 8/1932 | Straty | | 285/189 |
| 2,309,666 A | * | 1/1943 | Parker | | 29/890.148 |
| 3,672,197 A | * | 6/1972 | Popov et al. | | 72/79 |
| 3,740,813 A | * | 6/1973 | Moore | | 29/890.148 |
| 3,812,700 A | * | 5/1974 | Horton | | 72/79 |
| 3,953,247 A | * | 4/1976 | Elhaus et al. | | 148/508 |
| 4,674,171 A | * | 6/1987 | DeCell et al. | | 29/558 |
| 4,768,369 A | * | 9/1988 | Johnson et al. | | 72/368 |
| 5,906,047 A | * | 5/1999 | Miller et al. | | 29/890.132 |
| 6,145,185 A | * | 11/2000 | Hwang | | 29/557 |

* cited by examiner

Primary Examiner—Gregory Vidovich
Assistant Examiner—T. Nguyen
(74) Attorney, Agent, or Firm—Alan D. Kamrath; Rider Bennett, LLP.

(57) ABSTRACT

A method for manufacturing a pipe connector for a gas isolated switchgear has the steps of preparing a material block, a first forging process, a second forging process to form the material block to an I-shaped member, defining a passage through the I-shaped member, stretching the I-shaped member, a first heat treatment process (T4 process), straightening the I-shaped member to a desired length and a second heat treatment process (T6 process). With such a method, the processes for manufacturing the pipe connector are simple, and the cost for manufacturing the pipe connector is low.

6 Claims, 5 Drawing Sheets

METHOD FOR MANUFACTURING A PIPE CONNECTOR OF A GAS ISOLATED SWITCHGEAR

BACKGROUND OF THE INVENTION

1. Field of the Invention

The present invention relates to a method, and more particularly to a method for integrally forming a pipe connector of a gas isolated switchgear (G.I.S.)

2. Description of Related Art

With reference to FIGS. 9 and 10, a conventional pipe connector for a gas isolated switchgear (G.I.S.) in accordance with the prior art is composed of two flanges (30,32) and a tube (34). The flanges (30,32) and the tube (34) are made of aluminum alloy. The flanges (30,32) are respectively secured to two ends of the tube (34) by a welding process. After a heat treatment process and final working, the pipe connector can be used in a gas isolated switchgear.

However, the conventional method for manufacturing a pipe connector for a gas isolated switchgear involves the following shortcomings:

1. Because the pipe connector made by the conventional method is composed of three parts assembled by the welding process, there is the possibility gaps being defined between the parts due to errors in the welding process. These gaps will be of great significance because they may cause explosion or the release of the internal stress between two different welded parts. In addition, the structural strength of the combined pipe connector is not enough to withstand long term use.
2. The flanges (30,32) of the pipe connector are manufactured by a casting process. The tube (34) is formed with a plate being curled and being then welded, or formed by an extrusion process. Then, a further process, i.e. the welding process, is required to assemble the flanges (30,32) and the tube together (34). Consequently, the numerous processes for manufacturing a pipe connector for G.I.S. by the conventional method result in high labor costs and increase the chances of defective quality products. However, there is no scope for reducing costs in the manufacturing of the pipe connector by the conventional method.
3. To avoid explosion or leakage, several tests, including light test, pressing test and seal test and so on, must be carried out after the pipe connector has been manufactured. These tests further increase the already-high cost of the conventional connector. To overcome the shortcomings, the present invention tends to provide a method for integrally forming a pipe connector to mitigate or obviate the aforementioned problems.

SUMMARY OF THE INVENTION

The main objective of the invention is to provide a method for manufacturing a pipe connector for a gas isolated switchgear and that can simplify the processes and provide an economic cost for manufacturing the pipe connector.

Other objects, advantages and novel features of the invention will become more apparent from the following detailed description when taken in conjunction with the accompanying drawings.

DETAILED DESCRIPTION OF PREFERRED EMBODIMENT

Figure 1:
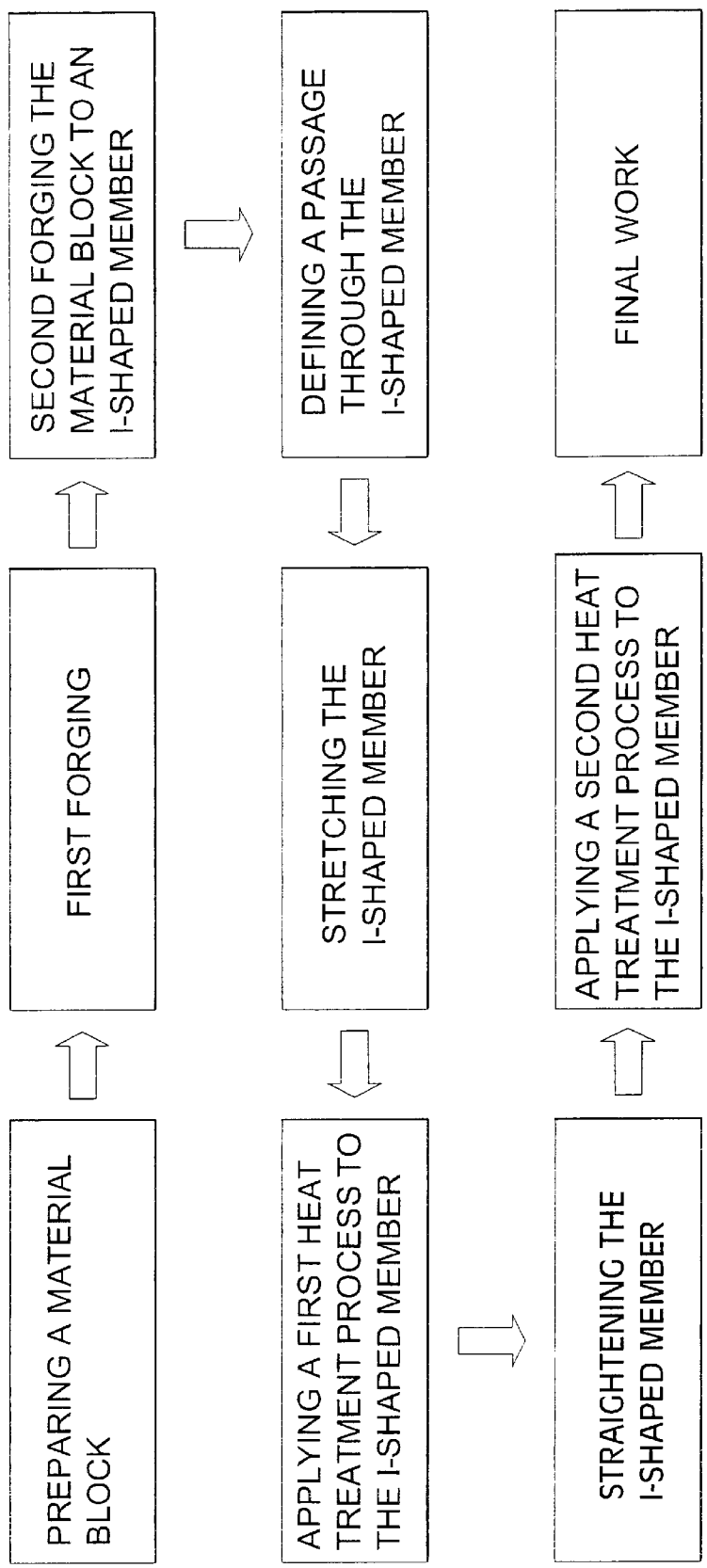
FIG. 1 is a flow chart of a method for manufacturing the pipe connector for a gas isolated switchgear in accordance with the prior art.
Figure 2:
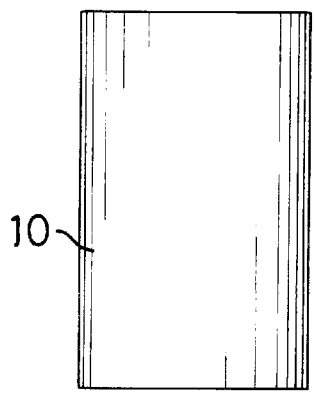
FIG. 2 is a schematic drawing of step 1 of the preparing process of the method in FIG. 1.
Figure 3:
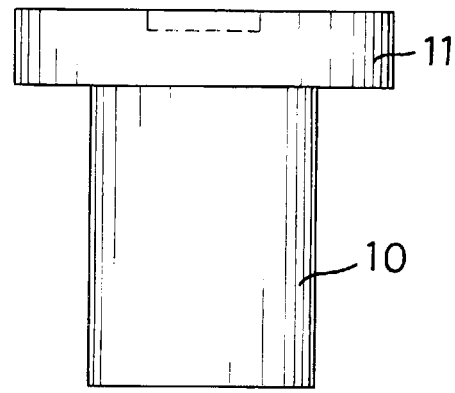
FIG. 3 is a schematic drawing of step 2 of the first forging process of the method in FIG. 1.
Figure 4:
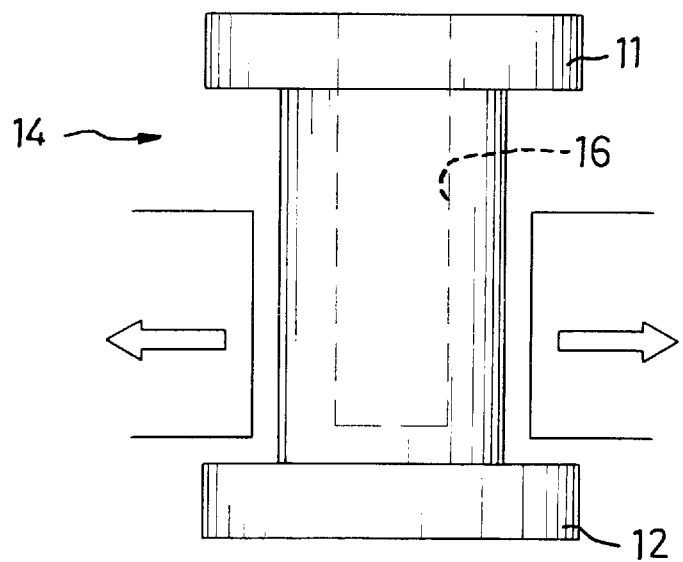
FIG. 4 is a schematic drawing of step 3 of the second forging process of the method in FIG. 1.
Figure 5:
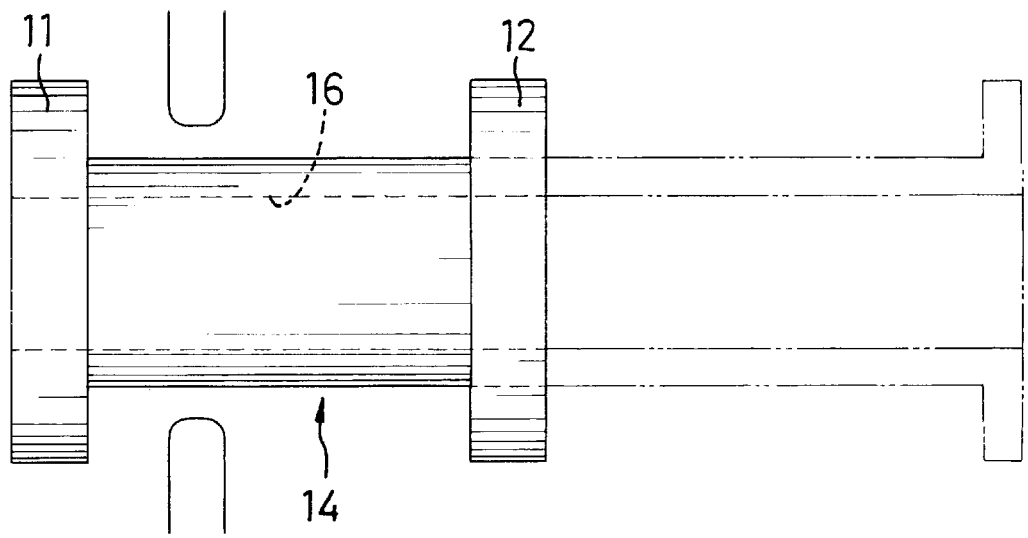
FIG. 5 is a schematic drawing of step 4 of the stretching process of the method in FIG. 1.
Figure 6:
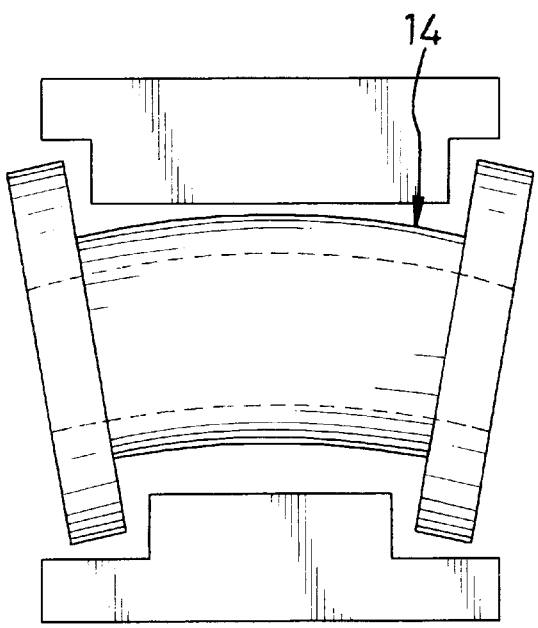
FIG. 6 is a schematic drawing of a first embodiment of step 6 of the straightening process of the method in FIG. 1.
Figure 7:
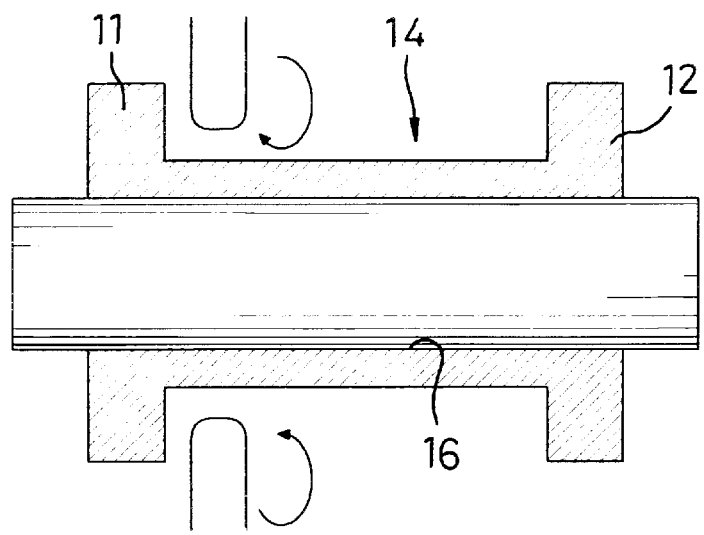
FIG. 7 is a schematic drawing of a second embodiment of step 6 of the straightening process in the method in FIG. 1.

With reference to FIG. 1, a method for manufacturing a pipe connector of a gas isolated switchgear (G.I.S.) in accordance with the present invention comprises the steps:

step 1: To prepare an aluminum alloy material block (10) as shown in FIG. 2. The material block (10) can be a cylindrical aluminum alloy ingot or made by an extruding process.

step 2: To heat the material block (10) to a desired temperature and to forge the material block (10) to form a first flange (11) on a first end of the material block (10) as shown in FIG. 3 with a hydraulic forging machine with a mold.

step 3: With reference to FIG. 4, to forge the material block (10) to form a second flange (12) on a second end of the material block (10) to form the material block (10) to an I-shaped member (14) with another hydraulic forging machine with another mold.

step 4: To define a passage (16) through the I-shaped member (14) with a pressing process or a drilling process.

step 5: To stretch the I-shaped member (14) to a desired length. To stretch the I-shaped member (14), with reference to FIG. 5, the I-shaped member (14) is stretched by at least one rotating presser.

step 6: To apply a first heat treatment process (T4 process) to the I-shaped member (14).

step 7: To straighten the I-shaped member (14) after the T4 heat treatment process to obviate the bend and deformation of the I-shaped member (14). In a first embodiment, with reference to FIG. 6, the I-shaped member (14) is straightened with a hydraulic pressing machine. In a second embodiment, with reference to FIG. 7, the I-shaped member (14) is straightened by two rotating rollers each roller respectively pressing two sides of the I-shaped member (14).

step 8: To apply a second heat treatment process (T6 process) to the I-shaped member (114).

step 9: To apply final work to the I-shaped member (14). The final work can include the step of defining multiple bores on each respective flange (11,12) on the I-shaped member (14), the step of trimming the surface of the I-shaped member (14) and the step of determining the outer and inner diameters of the I-shaped member (14) by a turning process.

Figure 8:
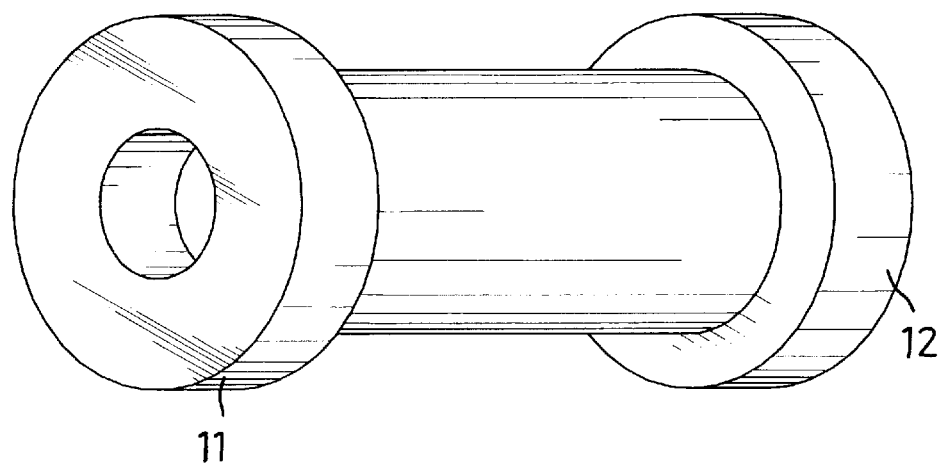
FIG. 8 is a perspective view of a pipe connector made with the method in FIG. 1.
Figure 9:
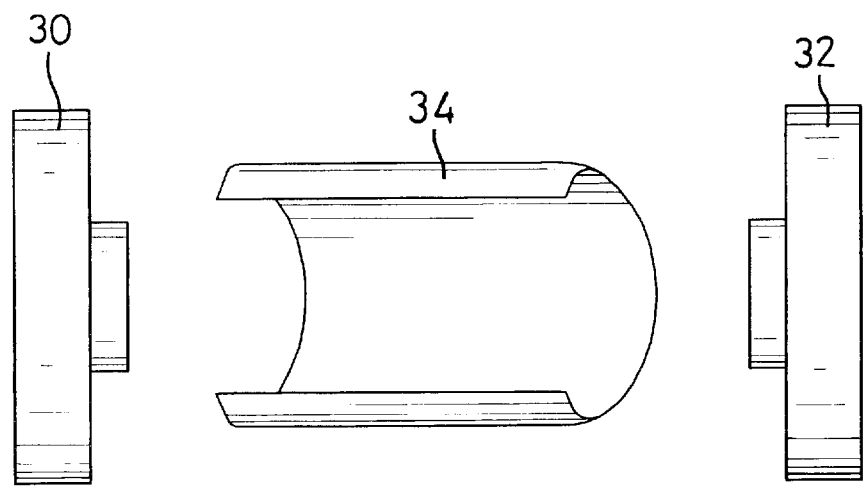
FIG. 9 is an exploded plan view of a conventional pipe connector for a gas isolated switchgear made by a conventional method in accordance with the prior art.
Figure 10:
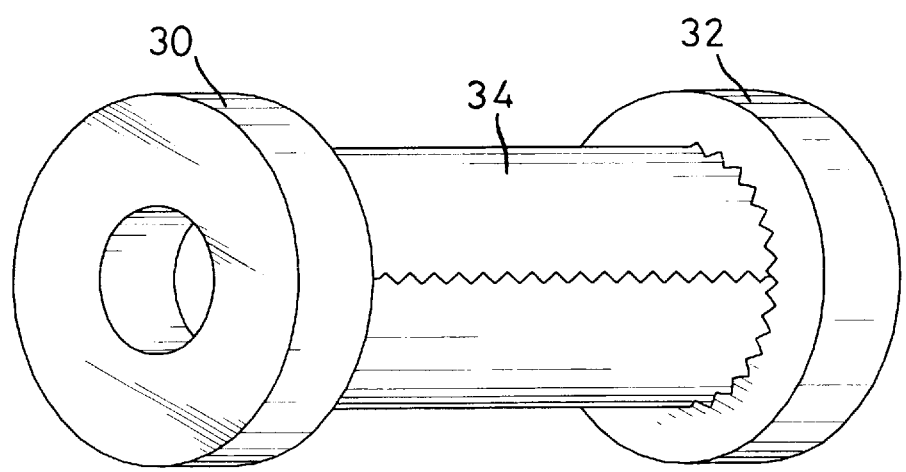
FIG. 10 is a perspective view of the conventional pipe connector made by a conventional method in accordance with the prior art.

By using the method in accordance with the present invention, an integral pipe connector as shown in FIG. 8 is achieved. With the integral pipe connector, the structural strength of the pipe connector is enhanced, and the processes for manufacturing the pipe connector are few and simple. In relation to the conventional pipe connector the useful life of the pipe connector is prolonged, and the cost for manufacturing the pipe connector is reduced. Because the pipe connector made by the method of this invention is an integral structure and no welding process is needed, gaps will not be defined in the integral structure. Thus, explosions can be avoided, and the safety of using the integral pipe connector is improved. In addition, the tests applied to the integral pipe connector can be decreased, such that additional cost for manufacturing the pipe connector is decreased.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a pipe connector of a gas isolated switchgear (G.I.S.) comprising the steps:

step 1: preparing an aluminum alloy material block;

step 2: first forging the material block to form a first flange on a first end of the material block;

step 3: second forging the material block in step 2 to form a second flange on a second end of the material block to form the material block to an I-shaped member;

step 4: defining a passage through the I-shaped member in step 3;

step 5: stretching the I-shaped member in step 4 to a desired length;

step 6: applying a first heat treatment process (T4 process) to the I-shaped member in step 5;

step 7: straightening the I-shaped member in step 6; and step 8: applying a second heat treatment process (T6 process) to the I-shaped member in step 7.

2. The method as claimed in claim 1, wherein the aluminum alloy material block is a cylindrical aluminum alloy ingot.

3. The method as claimed in claim 1, wherein the aluminum alloy material block is made by an extruding process.

4. The method as claimed in claim 1 further comprising a step 9 which includes a step to define multiple bores through each flange on the I-shaped member.

5. The method as claimed in claim 1, wherein to straighten the I-shaped member in step 7 uses a hydraulic pressing machine.

6. The method as claimed in claim 1, wherein to straighten the I-shaped member in step 7 uses two rotating rollers to respectively roller press two sides of the I-shaped member.

* * * * *